(12) United States Patent
Talius

(10) Patent No.: US 8,364,722 B2
(45) Date of Patent: Jan. 29, 2013

(54) HOSTING MULTIPLE LOGICAL DATABASES CONTAINED IN PHYSICAL DATABASE

(75) Inventor: Tomas Talius, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 12/689,243

(22) Filed: Jan. 19, 2010

(65) Prior Publication Data

US 2011/0179008 A1    Jul. 21, 2011

(51) Int. Cl.
G06F 17/30 (2006.01)

(52) U.S. Cl. .................................. 707/803; 707/796

(58) Field of Classification Search .................. None
See application file for complete search history.

(56) References Cited

U.S. PATENT DOCUMENTS

| | | | |
|---|---|---|---|
| 6,457,007 B1 * | 9/2002 | Kikuchi et al. ........................ | 1/1 |
| 6,490,590 B1 | 12/2002 | Fink | |
| 7,260,585 B2 * | 8/2007 | Krishnaprasad et al. ..... | 707/694 |
| 7,289,997 B1 * | 10/2007 | Kita et al. ............................ | 1/1 |
| 7,403,956 B2 * | 7/2008 | Vaschillo et al. ............. | 707/770 |
| 7,580,941 B2 | 8/2009 | Narasayya et al. | |
| 7,912,862 B2 * | 3/2011 | Vaschillo et al. ............. | 707/791 |
| 2008/0147704 A1 * | 6/2008 | Godwin et al. ................ | 707/102 |
| 2008/0306930 A1 | 12/2008 | Diederiks et al. | |
| 2009/0193006 A1 | 7/2009 | Herrnstadt | |

OTHER PUBLICATIONS

"Database Partition and Processor Environments", DB2 Version 9.5 for Linux, UNIX, and Windows, Retrieved at<<http://publib.boulder.ibm.com/infocenter/db2luw/v9r5/index.jsp?topic=/com.ibm.db2.luw.admin.partition.doc/doc/c0004569.html>>, Nov. 28, 2008.
Linthicum David, "Leveraging Information and Intelligence", Retrieved at<< http://www.ebizq.net/blogs/linthicum/2008/12/metadata_requirements_for_data.php>>, Dec. 14, 2008.
"Mapping a Conceptual Model to a Storage Schema", Microsoft MSDN Library, Retrieved at<<http://msdn.microsoft.com/en-us/library/bb399232.aspx>>, 2009.

* cited by examiner

*Primary Examiner* — Debbie Le

(57) ABSTRACT

Architecture that defines a logical database that shares physical resources with a containing physical database. The architecture isolates the relational engine system metadata parts of a database in horizontal scopes to form separate namespaces, and shares the underlying storage engine system metadata. Sharing physical database resources enables efficient input/output (I/O) utilization and instantaneous database creation and growth. In addition, logical databases can be backed up as a single transactionally consistent unit.

20 Claims, 6 Drawing Sheets

US 8,364,722 B2

HOSTING MULTIPLE LOGICAL DATABASES CONTAINED IN PHYSICAL DATABASE

BACKGROUND

Database creation can involve the further creation of physical backing files (e.g., data file and log). The physical files typically cannot be shared across databases, which leads to inefficient input/output (I/O) patterns (e.g., no sequential I/O for a transaction log) as well difficulties of growing those files on demand (or wasting reserved space if the files are not used). Additionally, the creation of such a database is slow because files need to be zeroed. This makes the hosting of multiple databases in large collocation or cloud environments inefficient.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture defines a logical database that shares physical resources with a containing physical database. The architecture applies to both partitioned and non-partitioned databases as well as replicated and non-replicated databases.

In a partitioned implementation, the architecture isolates relational engine system metadata parts of a database in horizontal partitions to form separate namespaces, and shares the underlying storage engine system metadata. Sharing physical database resources enables efficient input/output (I/O) utilization and instantaneous database creation and growth. In addition, logical databases can be backed up as a single transactionally consistent unit.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
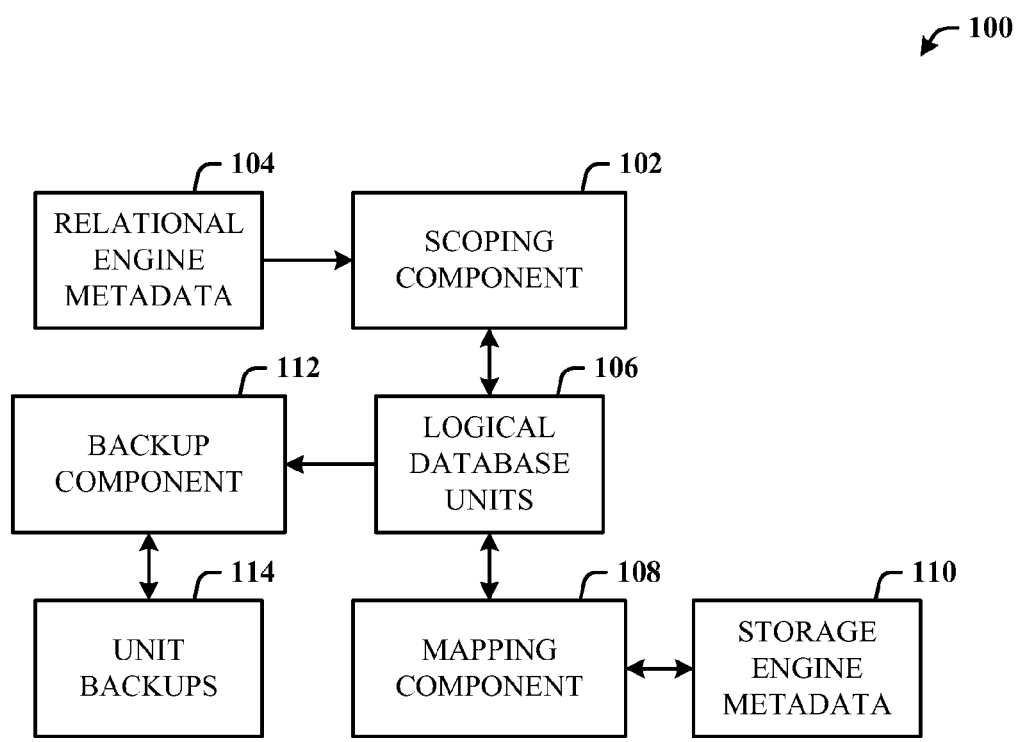
FIG. 1 illustrates a computer-implemented database management system in accordance with the disclosed architecture.

The disclosed architecture facilitates instant database creation, metadata isolation, and the sharing of input/output (I/O) resources across isolated databases. More specifically, a concept of a logical database is defined that shares the physical resources with a containing physical database. Relational engine system metadata parts of such a database are isolated in horizontal partitions to form separate namespaces, and the underlying storage engine system metadata is shared to each of the isolated databases. Note, however, although described in the context of partitioned databases, the disclosed architecture applies to unpartitioned databases as well.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented database management system 100 in accordance with the disclosed architecture. The system 100 includes a scoping component 102 that creates scopes (or collections) of logical database units 106 from relational engine metadata 104, and a mapping component 108 that maps the logical database units 106 to storage engine metadata 110 for sharing of the storage engine metadata 110 among the logical database units 106.

As described in greater detail herein, the logical database units 106 can include tables that are mapped to data structure information of the storage engine metadata 110. The logical database units 106 are isolated in horizontal scopes that form isolated respective namespaces. The mapping component 108 facilitates access to stored data structures of the storage engine metadata 110. The logical database units 106 are defined as tables having rows associated with an identifier. The logical database units 106 are created automatically, and in a more specific implementation, dynamically. The logical database units 106 are mapped many-to-one to the storage engine metadata 110. The storage engine metadata 110 can include data structure information, allocation unit information, and file information for recovery to which a logical database unit is mapped.

The system 100 can also optionally employ a backup component 112 that backs up each of the logical database units (scopes) as unit backups 114 a single transactionally consistent units.

Figure 2:
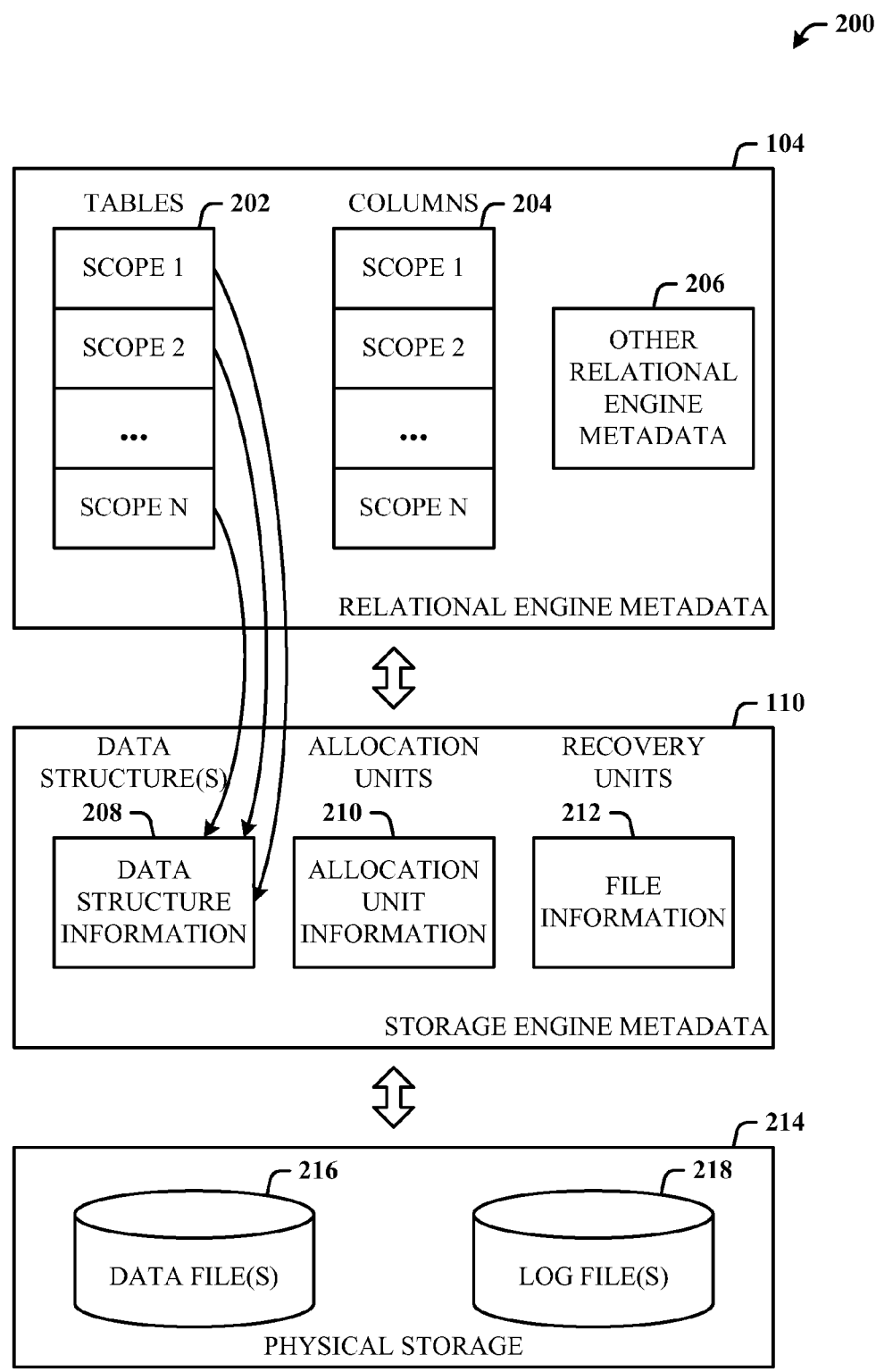
FIG. 2 illustrates additional details of a computer-implemented database management system in accordance with the disclosed architecture.

FIG. 2 illustrates additional details of a computer-implemented database management system 200 in accordance with the disclosed architecture. Scoped tables in the distributed database system have a column with the same name and type across all tables by which the tables are scoped. Each scope can include a horizontal slice of the tables, the slice defined by a range of values.

As illustrated, the relational engine metadata 104 can be scoped to include at least tables 202 (relational metadata system tables) and columns 204. The relational engine metadata 104 can include other relational metadata 206 as well. The tables 202 and columns 204 defines scopes (e.g., Scope 1, Scope 2, ..., Scope N), where each scope (e.g., Scope 2) is uniquely identified with a scope identifier (id) (e.g., scope_id). In other words, the scope (e.g., Scope 2) in the columns 204 has the same scope_id as the scope (Scope 2) in the tables 202. A unit of isolation is called a schema scope.

As further illustrated, the storage engine metadata 110 includes data structures having associated data structure information 208, allocation units and associated allocation unit information 210, and recovery units and associated file information 212. The storage engine metadata 110 can access a physical storage 214 that includes data file(s) 216 and log file(s) 218.

Put another way, the system 200 comprises a scoping component that automatically creates logical database scopes from relational engine metadata, and a mapping component that maps the logical database scopes to physical database resources for sharing of the physical database resources among the logical database scopes. The logical database scopes include tables, which the mapping component maps to a data structure of the physical database resources. Each of the logical database scopes is formed into an isolated scope. The logical database scopes can be created dynamically. The physical resources are storage engine metadata that includes data structure information, allocation unit information, and file information. The system 202 can also comprise the backup component that backs up each of the logical database scopes (units) as a single transactionally consistent unit.

In the context of a SQL (structured query language) server database, for example, there can be two sets of metadata: the relation engine metadata 104 for logical user visible concepts such as tables/types, and so on, and the storage engine metadata 110, which track metadata utilized for crash recovery.

The logical databases (units) are achieved by horizontally scoping (e.g., partitioning) the relational engine metadata 104 by prefixing the keys of such tables with a scope_id column (as described above), which is the leading key (a partition key).

The parts of the system that read the relational engine metadata 104 are provided with the scope_id value to perform filtering. This is included for both low-level metadata interfaces used when compiling relational queries and user queriable metadata views where predicates are injected during query compilation.

The relational engine metadata 104 refers to the storage engine metadata 110 to locate the data structures 208 (e.g., disk structures (b-trees and heaps)). The storage engine metadata 110 is not partitioned and, hence, remains unchanged. Thus, the storage engine metadata 110 can be globally queried for administrative purposes to compute how many resources each of the logical databases is using.

With respect to the mapping, conventional databases typically employ one-to-one relationships. That is, when creating a physical database, a set of files is obtained and then there is one set of relational schema and one set of physical metadata. Contrariwise, here, the mapping is many-to-one, where multiple instances of the relational schema all map into the single instance of the storage engine metadata 110 (or physical schema). The storage engine metadata 110 then maps into the data files and the log files, which then can be shared.

The tables 202 and columns 204 represent the metadata tables for the relational engine metadata 104. Since a column (of the columns 204) is the leading column of the single key, it then becomes effective to horizontally scope in multiple scopes. The columns 204 are represented as rows in the system tables 202. The rows in the metadata tables are horizontally scoped. Each of the rows belongs to a different scope. Each set of metadata that corresponds to each scope (row) shares the same scope. The actual tables that store the user data are unaltered because then the relational metadata 104 is being used to locate the user data in the system.

In an alternative embodiment, rather than scope horizontally in the tables, multiple instances of the metadata tables can be created. The same underlying physical resources of the files 216 and the logs 218 can be shared.

Following is a more detailed description of an exemplary implementation of the utilization of logical databases in a containing physical database. One goal of such an implementation is to provide a partitioned, highly available and cost efficient environment for SQL (e.g., transact-SQL (T-SQL)) applications.

In one particular implementation, multiple partitions are employed in a single SQL database, one reason of which is to share physical resources across the multiple partitions. For example, it can be assumed that many tenants will be small, and thus, need to be able to create partitions quickly without consuming significant space or resources. Examples of shared resources include, but are not limited to, log sequential I/O and write-ahead logging enforcement, data file placement and management (potentially sharable differential areas), per database caches (e.g., fixed overhead hash tables for caches—some caches are never shrunk such as metadata hash tables), and per database pages (e.g., system object tables).

The isolation of relation system metadata into different scopes enables having different sets of security principals that control objects (such as tables and stored procedures) in each physical database. Each tenant is provided the ability to perform logical administration (e.g., schema and security) as if it is a database owner in regular SQL server, yet removing the ability to perform physical changes to the database. The access to the physical database properties (such as backing data and log files and associated configuration) is controlled by security permissions that are inaccessible from within the logical databases. The logical database user is not allowed to create/alter/drop/backup underlying physical database and access dynamic management views that reveal information on other tenants collocated in the same database.

The shared parts of the physical database are the relational engine and storage engine metadata tables, file groups, and transaction log. If desired, the logical database tables can use the name of the user database which is not globally registered.

As previously described, the relational engine system metadata views are modified to include a predicate that filters the schema scope. In addition, certain system tables have immutable objects (such as the system types) present in all scopes. Such objects will have the schema scope_id tagged as zero, which is then visible to all the views. Using schema scope_id as the leading column of the system table keys allows scope isolation.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
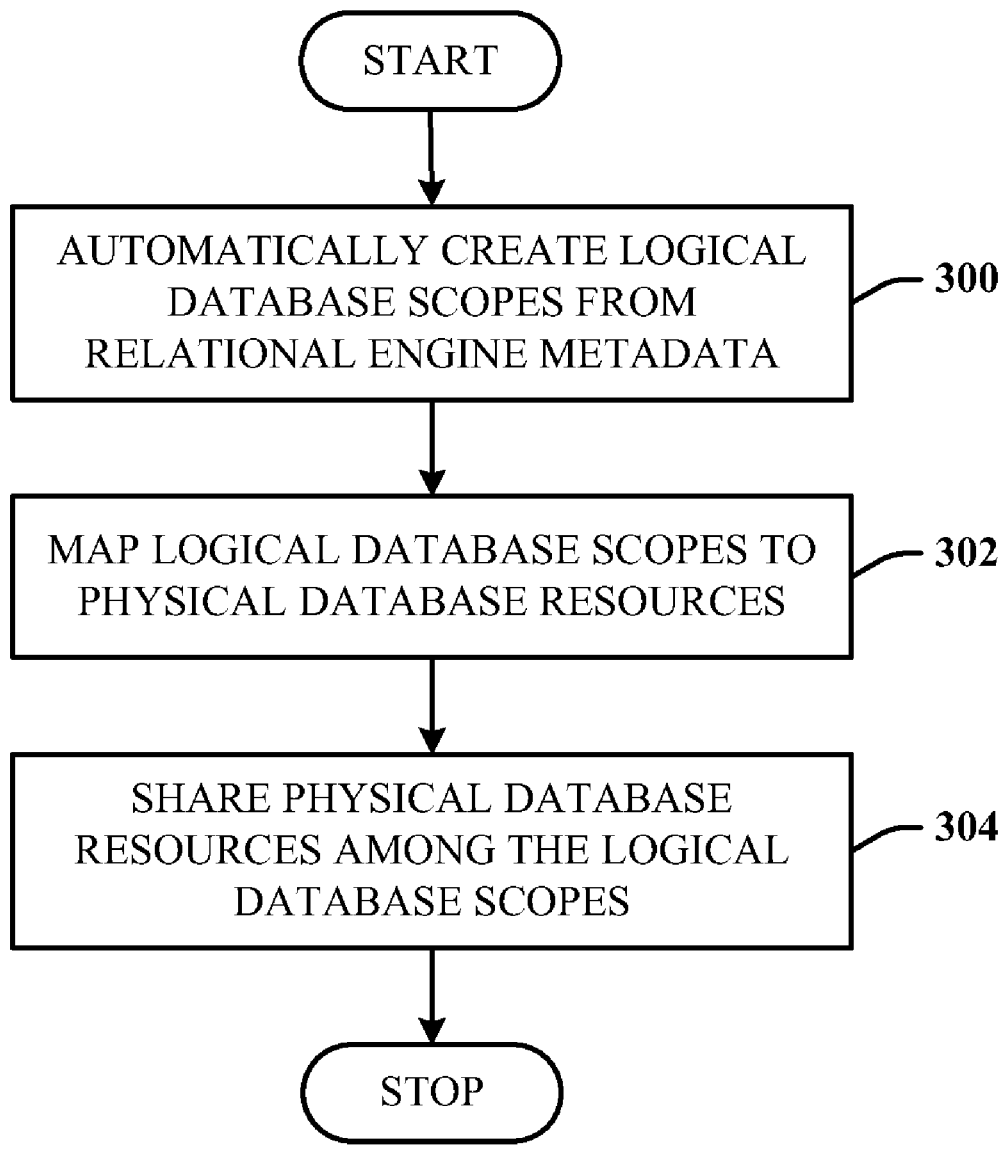
FIG. 3 illustrates a computer implemented database management method in accordance with the disclosed architecture.

FIG. 3 illustrates a computer implemented database management method in accordance with the disclosed architecture. At 300, logical database scopes are automatically created from relational engine metadata. At 302, the logical database scopes are mapped to physical database resources. At 304, the physical database resources are shared among the logical database scopes.

Figure 4:
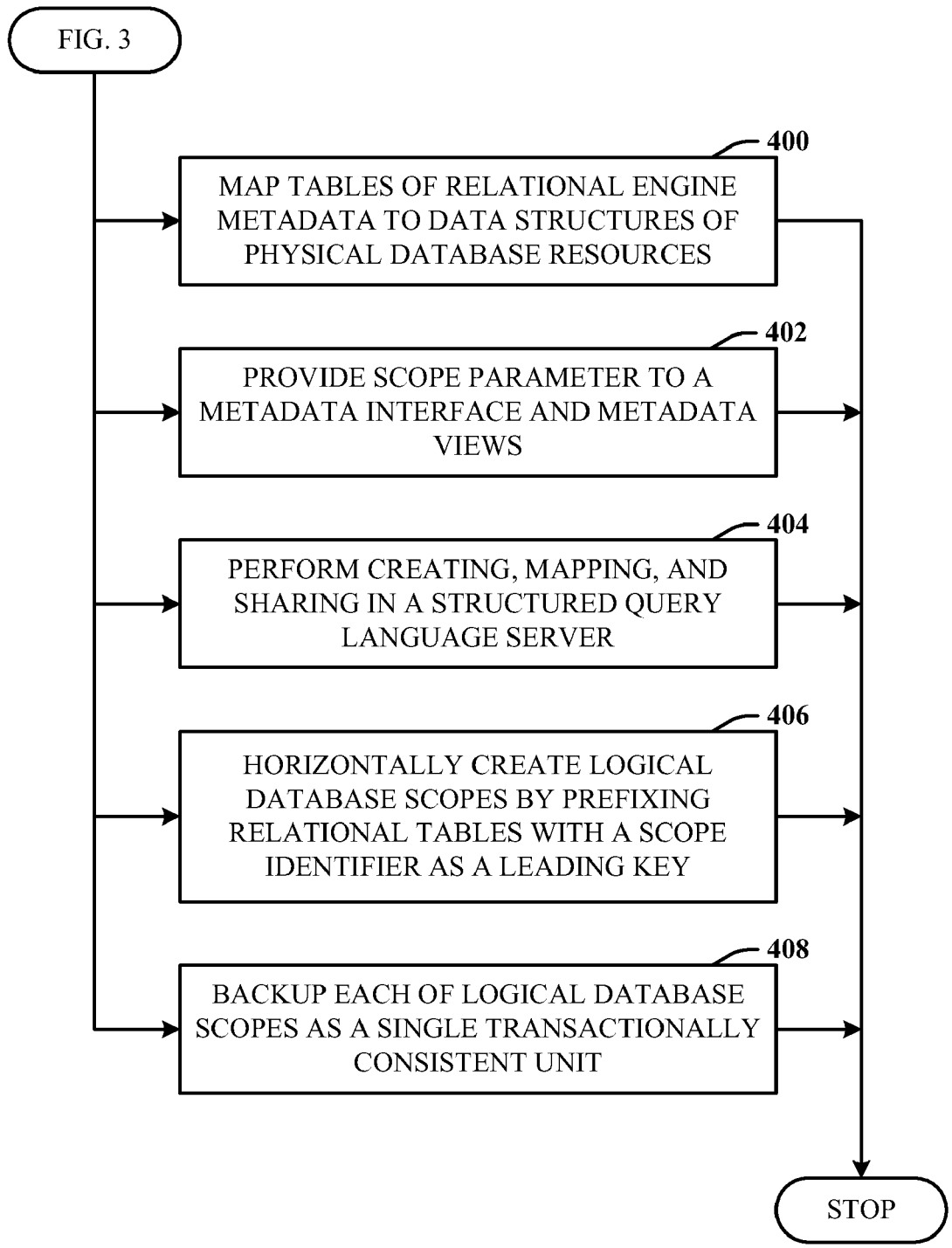
FIG. 4 illustrates additional aspects of the method of FIG. 3.

FIG. 4 illustrates additional aspects of the method of FIG. 3. At 400, tables of the relational engine metadata are mapped to data structures of the physical database resources. At 402, a scope parameter is provided to a metadata interface and metadata views. At 404, the creating, mapping, and sharing are performed in a structured query language server. At 406, the logical database scopes are created horizontally by prefixing relational tables with a scope identifier as a leading key. At 408, each of the logical database scopes is backed up as a single transactionally consistent unit.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
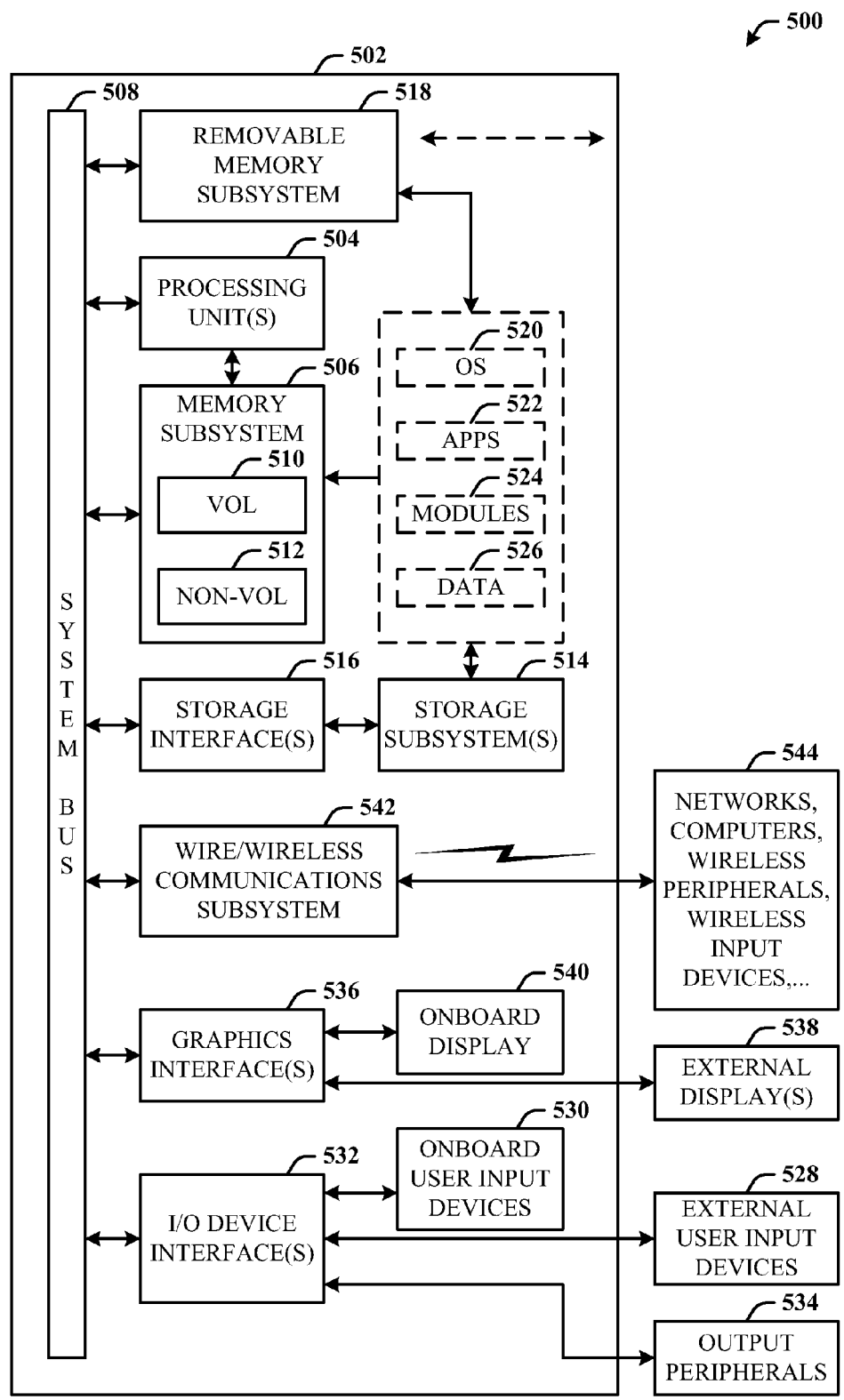
FIG. 5 illustrates a block diagram of a computing system operable to data management using logical units in accordance with the disclosed architecture.

Referring now to FIG. 5, there is illustrated a block diagram of a computing system 500 operable to data management using logical units in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

As a server machines, the one or more application programs 522, other program modules 524, and program data 526 can include the components and entities of the system 100 of FIG. 1, the components and entities of the system 200 of FIG. 2, and the methods represented by the flowcharts of FIGS. 3 and 4, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 6:
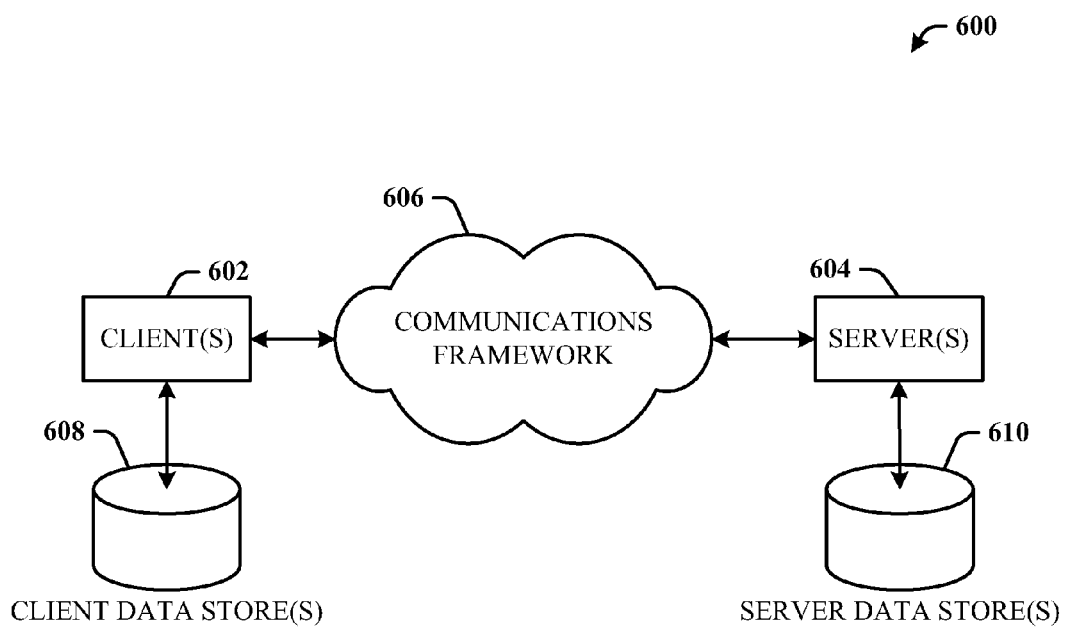
FIG. 6 illustrates a schematic block diagram of a computing environment that employs logical partitions in a containing physical database.

Referring now to FIG. 6, there is illustrated a schematic block diagram of a computing environment 600 that employs logical partitions in a containing physical database. The environment 600 includes one or more client(s) 602. The client(s) 602 can be hardware and/or software (e.g., threads, processes, computing devices). The client(s) 602 can house cookie(s) and/or associated contextual information, for example.

The environment 600 also includes one or more server(s) 604. The server(s) 604 can also be hardware and/or software (e.g., threads, processes, computing devices). The servers 604 can house threads to perform transformations by employing the architecture, for example. One possible communication between a client 602 and a server 604 can be in the form of a data packet adapted to be transmitted between two or more computer processes. The data packet may include a cookie and/or associated contextual information, for example. The environment 600 includes a communication framework 606 (e.g., a global communication network such as the Internet) that can be employed to facilitate communications between the client(s) 602 and the server(s) 604.

Communications can be facilitated via a wire (including optical fiber) and/or wireless technology. The client(s) 602 are operatively connected to one or more client data store(s) 608 that can be employed to store information local to the client(s) 602 (e.g., cookie(s) and/or associated contextual information). Similarly, the server(s) 604 are operatively connected to one or more server data store(s) 610 that can be employed to store information local to the servers 604.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented database management system having at least one processor configured to execute computer-executable components, the computer-executable components comprising:

a scoping component configured to create scopes of logical database units from relational engine metadata, the scoping component further configured to respectively isolate relational engine metadata parts corresponding to the scopes of the logical database units; and a mapping component configured to map the logical database units to storage engine metadata to facilitate a sharing of the storage engine metadata among the logical database units, wherein the storage engine metadata remains unchanged during an isolation of the relational engine metadata parts, and wherein multiple instances of the relational engine metadata map into a single instance of the storage engine metadata.

2. The system of claim 1, wherein the logical database units include tables that are mapped to data structure information of the storage engine metadata.

3. The system of claim 1, wherein the logical database units are isolated in horizontal scopes that form isolated respective namespaces.

4. The system of claim 1, wherein the mapping component facilitates access to stored data structures of the storage engine metadata.

5. The system of claim 1, wherein the logical database units are defined as tables having rows associated with an identifier.

6. The system of claim 1, wherein the logical database units are created automatically and are mapped many-to-one to the storage engine metadata.

7. The system of claim 1, wherein the storage engine metadata includes data structure information, allocation unit information, and file information for recovery to which a logical database unit is mapped.

8. The system of claim 1, further comprising a backup component that backs up a logical database unit as a single transactionally consistent unit.

9. A computer-implemented database management system having at least one processor configured to execute computer-executable components, the computer-executable components comprising:
- a scoping component configured to automatically create logical database partitions from relational engine metadata, the scoping component further configured to respectively isolate relational engine metadata parts corresponding to the logical database partitions; and
- a mapping component configured to map the logical database partitions to physical database resources to facilitate a sharing of the physical database resources among the logical database partitions, wherein the physical database resources remain unchanged during an isolation of the relational engine metadata parts, and wherein multiple instances of the relational engine metadata map into a single instance of the physical database resources.

10. The system of claim 9, wherein the logical database partitions include tables, and wherein the mapping component is further configured to map to a data structure of the physical database resources.

11. The system of claim 9, wherein each of the logical database partitions form a separate namespace.

12. The system of claim 9, wherein the logical database partitions are created dynamically.

13. The system of claim 9, wherein the physical resources are storage engine metadata that includes data structure information, allocation unit information, and file information.

14. The system of claim 9, further comprising a backup component that backs up each of the logical database partitions as a single transactionally consistent unit.

15. A computer-implemented database management method, comprising:
- automatically creating logical database scopes from relational engine metadata;
- respectively isolating relational engine metadata parts corresponding to the logical database scopes;
- mapping the logical database scopes to physical database resources, wherein the physical database resources remain unchanged during an isolation of the relational engine metadata parts, and wherein multiple instances of the relational engine metadata map into a single instance of the physical database resources; and
- sharing the physical database resources among the logical database scopes.

16. The method of claim 15, further comprising mapping tables of the relational engine metadata to data structures of the physical database resources.

17. The method of claim 15, further comprising providing a scope parameter to a metadata interface and metadata views.

18. The method of claim 15, further comprising performing the creating, mapping, and sharing in a structured query language server.

19. The method of claim 15, further comprising horizontally creating the logical database scopes by prefixing relational tables with a scope identifier as a leading key.

20. The method of claim 15, further comprising backing up each of the logical database scopes as a single transactionally consistent unit.

* * * * *